Feb. 25, 1941.  F. E. FENDER  2,232,941
PEELING AND SHREDDING DEVICE
Filed July 26, 1940
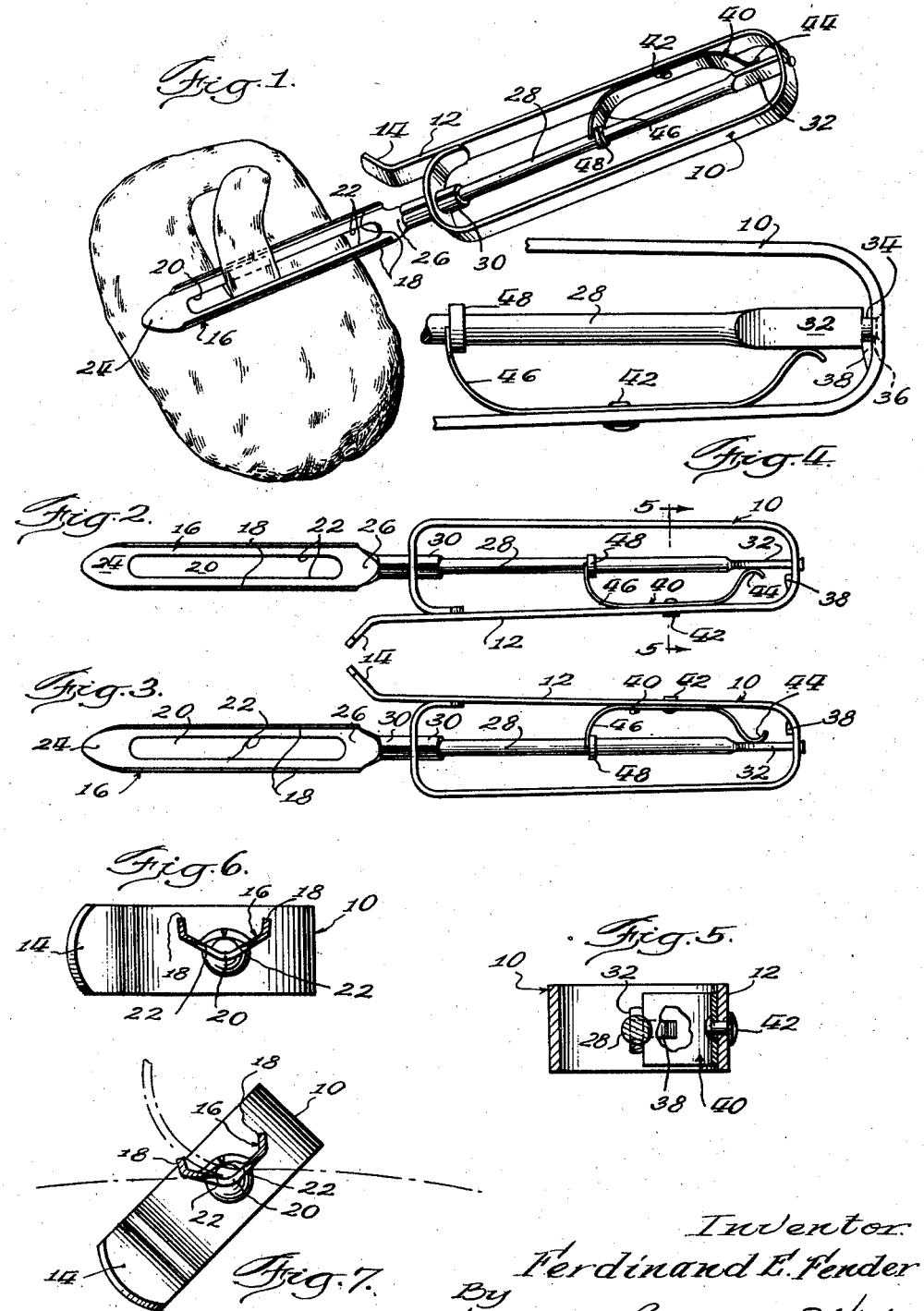
Inventor:
Ferdinand E. Fender
By Williams, Bradbury & Hinkle
Attys.

Patented Feb. 25, 1941

2,232,941

UNITED STATES PATENT OFFICE 2,232,941

PEELING AND SHREDDING DEVICE

Ferdinand E. Fender, Evanston, Ill., assignor to Vaughan Novelty Mfg. Co., Chicago, Ill., a corporation of Illinois Application July 26, 1940, Serial No. 347,589

7 Claims. (Cl. 30—279)

This invention relates to a device which is equally well adapted for peeling potatoes, apples and similar vegetables and fruits, or for shredding cabbages or other vegetables.

It is an important object of this invention to provide an improved peeling and shredding device, having an unsymmetrical handle, which can be manipulated in strokes either toward or away from the operator and which is equally well adapted for right- or left-hand operation.

It is a further object of my invention to provide an improved peeling and shredding device having a pivoted blade adapted to follow the uneven surface of a fruit or vegetable during a peeling or shredding stroke and in which the blade is always automatically presented to the surface of the fruit or vegetable in a position that will assure ready engagement of the blade.

Another object is to provide a novel peeling and shredding device having means to prevent the blade's skidding over or digging into the fruit or vegetable at the commencement of a cutting stroke.

Still another object of my invention is to provide a novel peeling and shredding device having a pivoted blade mounted upon a handle having a finger guard or rest upon one side, in which the finger rest may be positioned upon either side of the blade as desired.

Other objects and advantages will become apparent from the following description of the attached drawing, in which:

Fig. 1 is a perspective view of a device according to the present invention showing the positions assumed by the parts during a peeling operation;

Fig. 2 is a plan view of the device shown in Fig. 1, illustrating the relative positions of the blade and handle as they would be arranged for a right-handed shredding operation or a left-handed peeling operation;

Fig. 3 is a plan view similar to Fig. 2, but showing the device of the present invention with the parts arranged for a left-handed shredding operation or a right-handed peeling operation;

Fig. 4 is an enlarged plan view of the rear portion of the device, showing the positions assumed by the parts while the blade is being rotated relative to the handle;

Fig. 5 is a transverse sectional view, taken in the direction of the arrows along the line 5—5 of Fig. 2; and Figs. 6 and 7 are end elevations of the handle portion of the device with the cutting blade shown in transverse section illustrating respectively the positions assumed by the parts when the device is prepared for left-handed and right-handed peeling operations.

Referring to the drawing, in which similar numerals refer to similar parts throughout the several views, the peeling and shredding device comprises generally a handle 10 which is intended to be held in the hand of the operator and to which the other elements of the device are attached. This handle is formed of a length of strip steel bent, as shown, to form an elongated oval with one of the free ends welded in face-to-face contact with a portion of the strip spaced inwardly from the opposite end 12. This opposite end projects forwardly tangentially to the side of the handle for a short distance and then is curved outwardly to form a finger rest 14.

A cutting blade 16 is formed from a flat strip of high carbon or other cutlery steel which is curved longitudinally in a generally U-shaped form having upstanding edge ribs 18. The ribs 18 serve to stiffen and strengthen the blade, while the external central portion of the U is ground away at an obtuse angle from each side to provide a slot 20 through the central portion of the blade. This grinding is so conducted that a sharp cutting edge 22 is formed at each side of the slot 20 and thus either one or the other of the two cutting edges will always be in a position to cut when the device is moved in either transverse direction, while the opposite edge will slide over the surface of the vegetable or fruit and serve to regulate the thickness of the peels or shreds removed. The outward or free end of the blade 24 is sharpened to enable this end of the blade to be used in digging out eyes or bad spots from the potato or other vegetable being peeled.

The root portion 26 of the blade is rolled about and secured to one end of a round shaft 28, thus forming a cylindrical cuff 30. This shaft extends into the forward end of the handle through an opening therein of proper size to journal the blade at the cuff portion. The opposite end of this rod is flattened at 32 for a portion of its length and at its extreme end is provided with a cylindrical portion 34 of reduced diameter which extends through and is journaled in a complementary handle opening 36.

In assembling the blade to the handle this cylindrical portion 34 is extended through the opening 36 and the end of this portion is peened over sufficiently to prevent the blade from being withdrawn, but insufficiently to prevent a limited amount of longitudinal movement of the shaft relative to the handle. That is, when assembled the shaft should rotate freely relative to the handle and should also be movable longitudinally an amount something less than 1/16".

Adjacent the opening 36 in the handle a portion of the metal of which the handle is formed is struck inwardly to provide a stop 38. This stop should project inwardly a distance something less than the amount the shaft 28 is movable in an axial direction. Thus, with the shaft urged toward the rear of the handle this stop abuts against the flattened portion 32 to prevent complete rotation of the shaft. That is, the shaft may be rotated through an angle of something less than 180 degrees, but no farther. However, if the shaft 28 is moved in an axial direction toward the forward end of the handle, the flat portion 32 will be moved beyond the end of the stop 38 so that the shaft may be freely rotated through one or more complete revolutions.

A flat spring member 40 is secured at a position adjacent its mid point to the inner face of one of the side members forming the handle, by means of a rivet 42. The rearward portion 44 of this spring is bent inwardly so that it bears against the flattened portion of the shaft 32 with sufficient force to cause the shaft to be resiliently rotated to a position such that this flattened portion is parallel to the plane of the strip of which the handle is formed.

The forward end 46 of the spring 40 has a semi-circular re-entrant portion therein and is bent inwardly so that this re-entrant portion straddles the shaft 28 with the end portion of the spring bearing against the forward face of a collar 48 secured to the shaft. This spring tends resiliently to urge the collar and thus the shaft 28 rearwardly relative to the handle portion 10.

In use, the handle 10 is held in one hand of the operator with the finger rest 14 against the forefinger of the operator if the device is intended for a peeling operation, or against the thumb of the operator if it is intended to be used for shredding vegetables. The reason why the handle is held in these two different positions for the two types of operations is that it has been found that the average person conducts a peeling operation by holding the vegetable in one hand while holding the device in the other hand and that the cutting strokes are made by pulling the blade toward the operator, while shredding strokes are usually made by pushing the blade away from the operator.

After the handle has been properly grasped by the operator the blade is grasped by the fingers of the other hand and pulled outwardly against the resiliency of the spring 40 to free the flat portion 32 of the rod from the stop member 38. The blade is then rotated so that the cutting edges 22 are down and the blade released. After being released the forward end 46 of the spring 40 urges the shaft and blade rearwardly so that further rotation of the blade is limited to a matter of something less than 180 degrees. Simultaneously, the rearward end 44 of the spring 40 pressing against the flattened portion 32 rotates the blade into a position mid way between the limits provided by the stop 38 abutting against either one or the other side of the flattened portion 32.

During a peeling operation the handle is normally held in a somewhat inclined position, as shown in Fig. 7, so that the cutting edge 22 farther from the operator is lower than the other cutting edge. The device is then brought toward the operator until the blade comes in contact with the potato or other vegetable, at which point the receding edge of the blade will strike the vegetable and cause the blade to rotate into the cutting position shown in Fig. 7. Further movement of the device toward the operator will cause the sharp edge farther from the operator to cut into the potato, a slice of potato peeling curling upward through the slot 20. At the end of the peeling stroke the blade will be rotated by the rearward end 44 of the spring 40 into its original position and thus prepared for a second stroke.

If the device is desired to be used for a shredding operation the handle is held with the thumb against the rest 14, the blade pulled out and rotated as previously described, to bring it into proper cutting position and the vegetable shredded by slicing strokes directed away from the operator.

From the above it will be seen that the present device is adapted to be used for either a shredding or paring operation and that it may be used either in the right hand or left hand, while at the same time having the advantages that follow from the use of an unsymmetrical handle such as the one shown with a finger rest upon one side only.

Having described my invention what I claim is new and useful and desire to secure by Letters Patent of the United States is:

1. In a peeling and shredding device a handle, a cutting blade journaled in said handle for rotational and axial movement relative thereto, stop means cooperating between said handle and said blade to limit the relative rotational movement therebetween within predetermined limits when the blade is in one axial position and to permit free rotation of the blade when the blade is in another axial position.

2. In a peeling and shredding device a handle, a cutting blade journaled in said handle for rotational and axial movement relative thereto, stop means cooperating between said handle and said blade to limit the relative rotational movement therebetween within predetermined limits when the blade is in one axial position and to permit free rotation of the blade when the blade is in another axial position, and resilient means to urge said blade into the said one axial position.

3. In a peeling and shredding device a handle, a cutting blade journaled in said handle for rotational and axial movement relative thereto, stop means cooperating between said handle and said blade to limit the relative rotational movement therebetween within predetermined limits when the blade is in one axial position and to permit free rotation of the blade when the blade is in another axial position, resilient means to urge said blade into the said one axial position, and means resiliently to urge said blade into a rotational position substantially midway between said predetermined limits.

4. In a peeling and shredding device an unsymmetrical handle, a blade journaled for rotational movement relative to said handle, stop means to limit the rotational movement of said blade to less than 180 degrees, means to release the blade from the influence of said stop means to permit reversal of the position of the blade relative to said handle.

5. In a peeling and shredding device a handle, a cutting blade journaled in said handle for rotational and axial movement relative thereto, stop means cooperating between said handle and said blade to limit the relative rotational movement therebetween within predetermined limits when the blade is in one axial position and to permit free rotation of the blade when the blade is in another axial position, a flat spring secured to said handle at a point between its ends, one of the ends of said spring tending resiliently to urge said blade into the said one axial position and the other end of said spring tending to urge said blade into a predetermined rotational position.

6. In a peeling and shredding device a handle comprising a length of strip metal bent to form an elongated oval with one end of the strip being welded to the strip at a point spaced inwardly from the other end to provide an outwardly projecting member at one side of the handle, a shaft extending longitudinally through said handle and journaled to rotate and move axially therein, said shaft being provided with a flattened portion, a cutting blade secured to one end of the shaft and extending outwardly from the handle, a flat spring member secured intermediate its ends to said handle and bearing with one of its ends against said flattened portion, a stop member on said handle cooperating with said flattened portion to limit the rotational movement of said blade when the blade is in one axial position, and the other end of said spring tending to urge said blade toward said one axial position.

7. In a peeling and shredding device a handle comprising a length of strip metal bent to form an elongated oval with one end of the strip welded to the strip at a point spaced inwardly from the other end to provide an outwardly projecting member at one side of the handle, a shaft extending longitudinally through said handle and journaled to rotate and move axially therein, a cutting blade secured to one end of the shaft and extending outwardly from the handle, a stop member on said handle to limit the rotational movement of said blade, and means to release said stop member to permit complete rotation of said blade.

FERDINAND E. FENDER.